United States Patent [19]

Moore

[11] Patent Number: 5,772,370
[45] Date of Patent: Jun. 30, 1998

[54] RETRACTABLE AND/OR REMOVABLE NET TYPE CARGO RESTRAINING SYSTEM

[76] Inventor: Donal Moore, 2190 Northlawn, Birmingham, Mich. 48009

[21] Appl. No.: 561,926

[22] Filed: Nov. 22, 1995

[51] Int. Cl.⁶ .................................................. B60P 7/04
[52] U.S. Cl. ...................... 410/100; 410/117; 410/118; 410/97; 296/37.16
[58] Field of Search ................................ 296/24.1, 37.1, 296/37.16, 37.15; 410/117, 118, 97, 100; 160/327, 351; 280/749

[56] References Cited

U.S. PATENT DOCUMENTS

| | | |
|---|---|---|
| Re. 28,788 | 4/1976 | Williamson, III . |
| D. 325,016 | 3/1992 | Moore . |
| 2,669,402 | 2/1954 | Del Mar . |
| 2,705,461 | 4/1955 | Campbell .................................. 410/97 |
| 2,854,931 | 10/1958 | Campbell . |
| 2,997,331 | 8/1961 | Kudner . |
| 3,049,373 | 8/1962 | Biggers . |
| 3,098,562 | 7/1963 | Simmons . |
| 3,099,316 | 7/1963 | Peck et al. . |
| 3,169,781 | 2/1965 | Abruzzion . |
| 3,190,686 | 6/1965 | Smiler . |
| 3,256,837 | 6/1966 | Blatt . |
| 3,314,379 | 4/1967 | Krokos . |
| 3,336,069 | 8/1967 | Bayer et al. . |
| 3,367,707 | 2/1968 | Merriweather . |
| 3,486,723 | 12/1969 | Harrison . |
| 3,527,984 | 9/1970 | Flanagan et al. . |
| 3,534,998 | 10/1970 | Johnson et al. . |
| 3,612,301 | 10/1971 | Peacock . |
| 3,633,936 | 1/1972 | Huber . |
| 3,662,229 | 5/1972 | Graff et al. . |
| 3,695,698 | 10/1972 | Trump . |
| 3,762,495 | 10/1973 | Usui et al. . |
| 3,762,760 | 10/1973 | Tomson et al. . |
| 3,767,066 | 10/1973 | Martin et al. . |
| 3,767,253 | 10/1973 | Kluetsch . |
| 3,782,758 | 1/1974 | Williamson, III . |
| 3,837,422 | 9/1974 | Schlanger . |
| 3,891,263 | 6/1975 | Orsulak . |
| 3,910,625 | 10/1975 | Menard .................................. 296/37.1 |
| 4,096,807 | 6/1978 | Woodward . |
| 4,121,356 | 10/1978 | Gambon . |
| 4,139,231 | 2/1979 | Lang et al. ............................ 296/37.16 |
| 4,168,667 | 9/1979 | Loomis . |
| 4,213,636 | 7/1980 | Jing . |
| 4,215,895 | 8/1980 | Phillips . |
| 4,265,577 | 5/1981 | Loomis .................................. 410/118 |
| 4,368,902 | 1/1983 | McDowell . |

(List continued on next page.)

FOREIGN PATENT DOCUMENTS

| | | |
|---|---|---|
| 203824 | 12/1986 | European Pat. Off. ............ 296/37.16 |
| 0659611 | 6/1995 | European Pat. Off. . |
| 2470033 | 6/1981 | France . |
| 3419758 | 11/1985 | Germany . |
| 2759777 | 6/1986 | Germany . |
| 3738931 | 6/1989 | Germany . |
| 4300904A | 7/1993 | Germany ................................ 410/118 |
| 19520584 | 12/1996 | Germany . |
| 61-193949 | 8/1986 | Japan . |
| 4002534 | 1/1992 | Japan ...................................... 410/87 |
| 2273481 | 6/1994 | United Kingdom .................. 410/100 |

*Primary Examiner*—Stephen Gordon
*Attorney, Agent, or Firm*—Young & Basile, P.C.

[57] ABSTRACT

A net type cargo restraining system for motor vehicles of the type having a cargo floor with a front area, and a hinged exterior door which opens from outside the vehicle to provide access to the cargo floor. The restraining system comprises a net member having a length, the net member being detachably connected between a first point proximate the front area of the cargo floor and a second point on the door, whereby the net member is raised and lowered with the door to provide access to the cargo floor for loading and unloading purposes and to capture cargo on the floor when the door is closed. The restraining system further comprises a mechanism for varying the length of the net member between the first point and the second point while maintaining significant tension in the net member, thereby to accommodate cargo of varying size.

16 Claims, 6 Drawing Sheets

5,772,370

Page 2

U.S. PATENT DOCUMENTS

| | | | |
|---|---|---|---|
| 4,396,325 | 8/1983 | Joice-Cavanagh | 410/129 |
| 4,436,466 | 3/1984 | Marino | 410/118 |
| 4,763,944 | 8/1988 | Fry et al. . | |
| 4,781,498 | 11/1988 | Cox | 410/118 |
| 4,852,194 | 8/1989 | Langan . | |
| 4,900,204 | 2/1990 | Summers | 410/97 |
| 4,915,437 | 4/1990 | Cherry . | |
| 4,919,467 | 4/1990 | Guimelli . | |
| 4,957,250 | 9/1990 | Hararat-Tehrani | 410/118 X |
| 4,964,771 | 10/1990 | Callihan | 410/118 |
| 4,981,225 | 1/1991 | Cole . | |
| 5,026,231 | 6/1991 | Moore . | |
| 5,035,471 | 7/1991 | Ackerman . | |
| 5,040,934 | 8/1991 | Ross | 410/97 |
| 5,090,856 | 2/1992 | Moore . | |
| 5,102,103 | 4/1992 | Putnam . | |
| 5,114,288 | 5/1992 | Langendorf et al. | 410/34 |
| 5,121,958 | 6/1992 | Goeden et al. | 410/117 X |
| 5,139,375 | 8/1992 | Franchuk | 410/105 |
| 5,170,829 | 12/1992 | Duncan et al. . | |
| 5,207,260 | 5/1993 | Commesso . | |
| 5,316,358 | 5/1994 | Payne et al. . | |
| 5,328,310 | 7/1994 | Lockney | 410/97 |
| 5,348,433 | 9/1994 | Watson . | |
| 5,353,891 | 10/1994 | Griek et al. . | |
| 5,427,486 | 6/1995 | Green . | |
| 5,437,474 | 8/1995 | Ament . | |
| 5,444,836 | 8/1995 | Hollingsworth et al. . | |
| 5,452,973 | 9/1995 | Arvin | 410/118 |
| 5,458,447 | 10/1995 | Clason | 410/100 |
| 5,551,726 | 9/1996 | Ament | 280/749 |

RETRACTABLE AND/OR REMOVABLE NET TYPE CARGO RESTRAINING SYSTEM

BACKGROUND OF THE INVENTION

The present invention relates generally to load retention nets, and more particularly to such load retention nets which may be retractable and/or removable.

Governments around the world are beginning to recognize the need for automotive safety standards for passengers above and beyond such items as passive passenger restraint systems. For example, recently the United Nations and European communities began imposing laws in which automobile manufacturers must attempt to provide a safe environment for passengers while traveling with minimum loads of 20 Kg to 100 Kg. This weight should be restrained by a restraint mechanism during frontal impacts at 50 km/h, with approximate maximum deflection of the restraint mechanism being about 300 mm or less. The minimum force this would generate during such an impact is quite high. As such, the above-mentioned lawmakers are hoping to see means by which high G-force loads are restrained from entering the passenger compartments of motor vehicles such as station wagons, sport utilities, mini vans and other motor vehicles, including passenger vehicles having fold-down rear seats.

In addition, consumers continually seek more efficient, convenient and versatile ways to transport or store contents to be stowed in such a motor vehicle. One disadvantage of the traditional storage space in the above-mentioned motor vehicles is that stowage is freely movable within the storage compartment, and can be damaged during transport and/or in the event of a sudden stop or impact.

Attempts have been made to answer the above-mentioned needs. One such attempt is found in U.S. Pat. No. 4,919,467 issued to Guimelli. This patent discloses a vehicle safety screen having a tubular metal peripheral frame traversed by a heavy wire mesh. The frame is mounted to four vehicle anchorage points via rearwardly projecting upper metal securing straps. The ends of the straps adjacent the anchorage points are attached thereto by a securing bolt extending transversely through the strap end, a cover plate, the vehicle body panel and a mounting plate, and is engaged within a captive nut.

The Guimelli patent answers the safety need relatively satisfactorily; however, the heavy wire mesh and tubular metal frame are aesthetically displeasing. Further, specific tools must be used to attach and/or detach the device, and such attachment/detachment can be time consuming and difficult. Still further, if the securing bolt is not properly engaged (which could be difficult to determine), the device could detach in the event of a crash; and, due to the heaviness of the device, the device itself could cause injury. Further, in the event of a sudden stop, the sound of items striking the heavy wire mesh would be quite loud, and the items could be damaged after impacting the wire mesh. Yet still further, if the device were not needed, due to the difficulty in removing it, the consumer may leave it installed although undesired. Even if it were removed, due to its bulkiness, storage of it within the motor vehicle would be limited to laying it flat on the floor, thereby taking up valuable storage space and being subject to noisy movement during transport.

U.S. Pat. No. 3,891,263 issued to Orsulak discloses a safety shield and compartmentalizer wherein the vehicle rear seat is modified to hold a cylindrical container having a flexible, opaque panel adapted to be pulled out of the container through a longitudinal slot in the container and outward from a transverse slot defined in the upper rear portion of the rear seat back rest. The panel is pulled from a retracted position and fastened to the rear wall or roof of the vehicle. The panel is retracted by an electric motor or a conventional window shade apparatus.

The Orsulak patent answers the safety need somewhat; however, it appears that the attachment means would not be load restraining in the event of a frontal impact as described above a simple "window shade apparatus" or electric motor may not prevent further opaque panel from paying out, thereby allowing cargo to travel farther than desired, which may result in injury to passengers. Further, although the Orsulak device may be considered more aesthetically pleasing than the Guimelli device, it is not practical for installation in a motor vehicle. Even if feasible (given the strict weight limits, design specifications, passenger compartment space constraints, etc. for motor vehicles), it would be very expensive and difficult to develop and/or modify tooling to include such a cylindrical container, panel retracting motor and/or window shade apparatus defined within the rear seat. Still further, if the device were not included as an OEM option, it would be very difficult, if not impossible to include it as an after market option.

Thus, it is an object of the present invention to provide a load retention net which will satisfactorily restrain loads from entering the passenger compartment of a motor vehicle during frontal, side and/or rear impacts, thereby advantageously providing safety to passengers. It is a further object of the present invention to provide such a net which is aesthetically pleasing. It is another object of the present invention to provide such a net which is quickly attachable/detachable from its respective vehicle attachment areas, without the need for tools. It is a further object of the present invention to provide an attachment means for such a net, which attachment means is advantageously simple to discern if complete. It is yet a further object of the present invention to provide such a net which will aid in noise attenuation of the stowage during such jostling and/or other movement. It is a further object of the present invention to provide such a net which is easy to handle and compactable for storage. Yet another object of the present invention is to provide such a load retention net which, when retractable, has a means for preventing the net from paying out during frontal, side and/or rear impacts. Further, it is an object of the present invention to provide such a net which is relatively inexpensive and simple to manufacture and install within the motor vehicle, and may be done either as an OEM option or as an after market option. Still further, it is an object of the present invention to provide such a net which is strong and resilient, yet lightweight. It is yet a further object of the present invention to provide a net type cargo restraining system for a motor vehicle which is essentially automatic in its operation. Still further, it is an object of the present invention to provide a net type cargo restraining system which automatically adjusts itself to accommodate cargo of varying size and volume. Further, it is an object of the present invention to provide a net type cargo restraining system which may be easily removed from the vehicle, if desired.

SUMMARY OF THE INVENTION

The present invention addresses and solves the above-mentioned problems by providing a net type cargo restraining system for motor vehicles of the type having a cargo floor with a front area, and a hinged exterior door which opens from outside the vehicle to provide access to the cargo floor. The restraining system comprises a net member having a length, the net member being detachably connected between a first point proximate the front area of the cargo floor and a second point on the door, whereby the net member is raised and lowered with the door to provide access to the cargo floor for loading and unloading purposes and to capture cargo on the floor when the door is closed. The restraining system further comprises means for varying the length of the net member between the first point and the second point while maintaining significant tension in the net member, thereby to accommodate cargo of varying size.

BRIEF DESCRIPTION OF THE DRAWINGS

Other objects, features and advantages of the present invention will become apparent by reference to the following detailed description and to the drawings, in which.

DETAILED DESCRIPTION OF THE PREFERRED EMBODIMENTS

Figure 1:
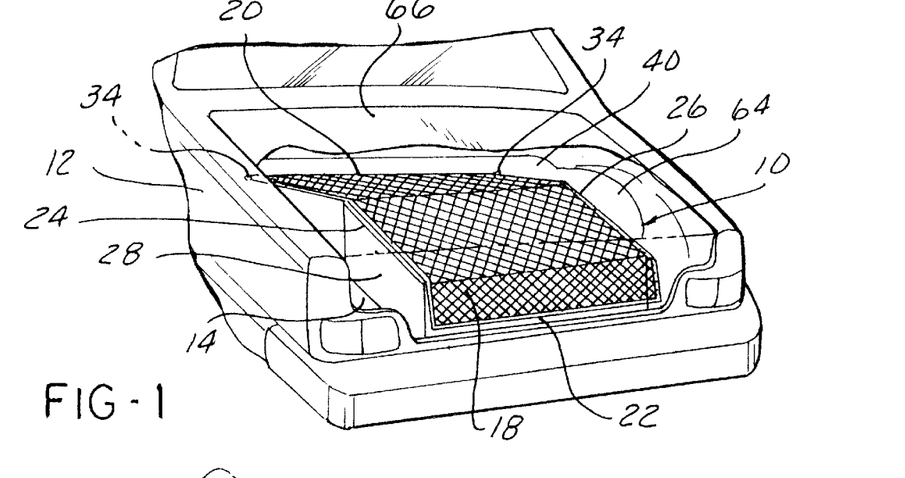
FIG. 1 is a cutaway perspective view of the load retention net/net type cargo restraining system of the present invention, shown restraining cargo in a trunk compartment, with the deck lid broken away.
Figure 1A:
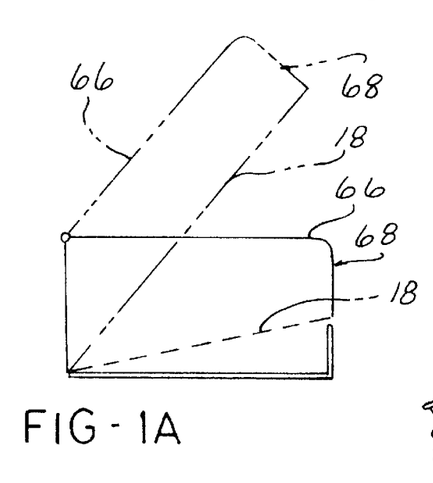
FIG. 1A is a schematic view of the trunk area of FIG. 1, showing the deck lid with the net of the present invention attached thereto, the net being shown in hidden line with the deck lid in the closed position, and in phantom with the deck lid in the open position.

Referring now to FIG. 1, the load retention net of the present invention is designated generally as 10. Load retention net 10 is for use within a motor vehicle 12 having a cargo area 14 and a passenger compartment 16. The load retention net 10 comprises a netting member 18 having a top 20, a bottom 22 and two opposed sides 24, 26, netting member 18 adapted to restrain stowage 28 within the cargo area 14 from entering the passenger compartment 16. With the net 10 of the present invention, if the stowage 28 weighs between about 20 Kg and about 100 Kg, it should be restrained during frontal impacts up to about 50 km/h, with approximate maximum deflection of net 10 being about 300 mm or less.

Figures 4A, 4C:
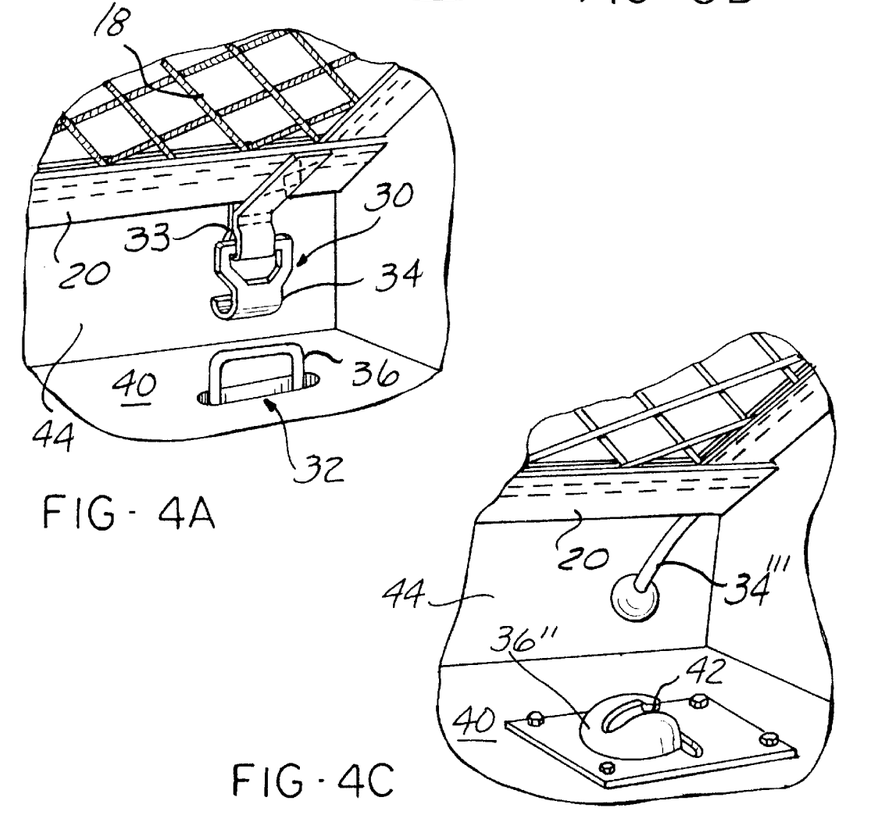
FIG. 4A is a cutaway perspective front view of a manufacturer installed J-hook for attaching the net of the present invention to the floor area adjacent the bottom of the rear seat.
FIG. 4C is a cutaway perspective view of an after market installed, alternate means for attaching the net of the present invention to the floor area adjacent the bottom of the rear seat.

It is to be understood that the netting member 18 may be formed from any suitable material and by any suitable process. However, in the preferred embodiment, the netting member 18 comprises a lightweight, resilient and strong synthetic material selected from the group consisting of coated polyesters, multifilament polypropylenes, nylons, and mixtures thereof. It may further comprise any suitable natural materials. Further, in the preferred embodiment, the netting member 18 is formed by at least one of woven, knitted, rochelle, and weft insertion processes. Netting members 18 formed from the woven and rochelle processes are shown in FIGS. 4C and 4A, respectively; and from the weft insertion process in FIGS. 7A, 7B, 8B and 8C.

Figure 6:
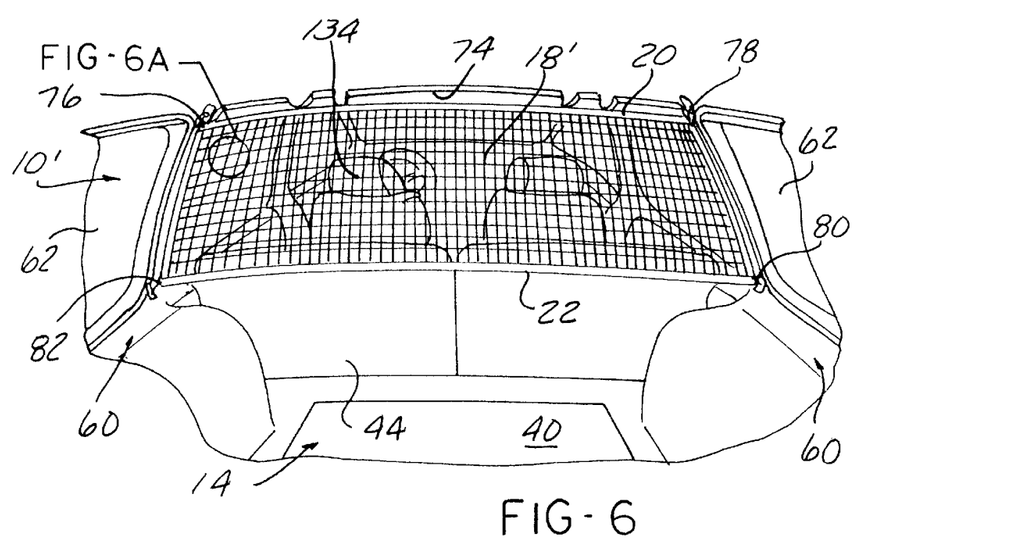
FIG. 6 is a partially cutaway perspective view of a further embodiment of the present invention, showing the net attached near the roof of a station wagon and just below the upper edge of the rear seat, and extending across the open area between the cargo area and the passenger area, just behind the rear seat.
Figure 6A:
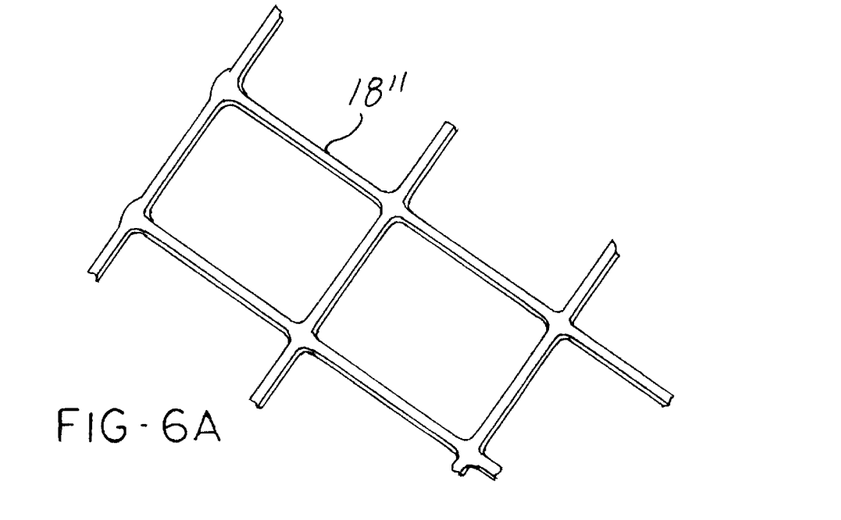
FIG. 6A is an enlarged view of an alternate embodiment of netting material for the net of FIG. 6.

Netting member 18" may also be formed from a flexibly rigid, extruded polymeric material such as engineered plastics, which is shown in FIG. 6A. If used, it is preferred that this extruded material be used in the embodiment depicted in FIG. 6. However, in the preferred embodiment, the netting member 18' in the embodiment shown in FIG. 6 is selected from the group consisting of coated polyesters, multifilament polypropylenes, nylons, and mixtures thereof, and is formed by processes as described above.

Load retention net 10 further comprises means for attaching the netting member 18 to the cargo area 14. The attaching means may comprise means for attaching the netting member top 20 to the cargo area 14; and means for attaching the netting member bottom 22 to the cargo area 14. It is to be understood that these attaching means may comprise any suitable means. Preferred attaching means will be described below.

In the embodiment shown in FIGS. 1–5, either the netting member top 20 attaching means or the netting member bottom 22 attaching means is removable, and the other of the netting member top 20 attaching means or the netting member bottom 22 attaching means is retractable.

Although it is to be understood that the removable attaching means may comprise any suitable means, some preferred examples are shown in FIGS. 4A–4D and 7A–7B. Referring now to FIG. 4A, the removable attaching means comprises two matingly engageable couplers 30, 32, one coupler 30 disposed on the netting member 18, and the other coupler 32 disposed on the cargo area 14. The couplers 30, 32 may comprise a male member 34 extending outwardly from one of the netting member 18 and the cargo area 14—as shown, male member 34 extends outwardly from the netting member 18; and a female member 36 defined in the other of the netting member 18 and the cargo area 14, and complementarily shaped to the male member 34—as shown, female member 36 is defined in cargo area 14.

It is to be understood that both male member 34 and female member 36 may comprise any suitable size, shape and configuration, and may be formed from any suitable material adapted to retain specified loads. In the preferred embodiment, these members 34, 36 (as well as coupling members 84, 86 described below) may be formed from engineered plastic material or metal; however, engineered plastic such as glass-filled nylon is preferable.

Figures 4B, 4D, 8A:
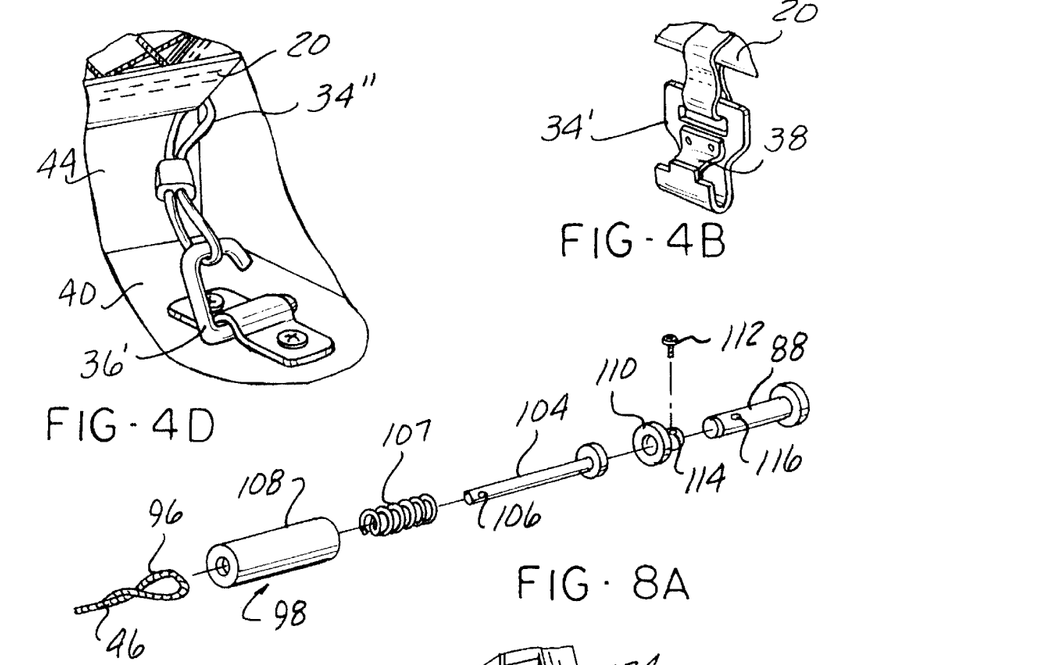
FIG. 4B is a perspective rear view of the J-hook of FIG. 4A, shown with an optional snap plate for positive attachment.
FIG. 4D is a view similar to that of FIG. 4C, showing a further alternate means for attaching.
FIG. 8A is an exploded perspective view of the attachment means and net tautening means shown in FIG. 7B.

In the preferred embodiments, some illustrative examples of male members 34, 34', 34" and 34'" include the J-hook sewn via an attaching strap 33 adjacent a top 20 corner of netting member 18, shown in FIG. 4A. It is to be understood that strap 33 may be formed of any suitable material, however, in the preferred embodiment, this material is polyester or nylon web strap, or a woven back vinyl material. In FIG. 4B, an alternate J-hook 34' is shown, with a snap plate 38 for positive attachment with female member 36 comprising a hook member (FIG. 4A) extending outwardly from the cargo area floor 40, directly behind the rear passenger seat 44. A further alternate male member comprises the loop member 34" shown in FIG. 4D, for attachment with alternate female member comprising a C-hook 36'. In FIG. 4C, the male member comprises a spherical projection 34'" for a snap fit engagement with female member comprising a complementarily shaped anchor plate 36" having a nib 42 for positive seating.

The embodiment shown in FIG. 4A is an option showing an OEM (Original Equipment Manufacturer) design; while those shown in FIGS. 4C and 4D are after market designs.

Although any number may be used, in the preferred embodiment, as best seen in FIG. 1, there are two opposed male members 34 disposed on the netting member 18, each male member 34 adjacent a netting member side 24, 26. Similarly, there are two female members 36 defined in the cargo area 14 at respective locations adapted to receive the two male members 34.

Figure 3A:
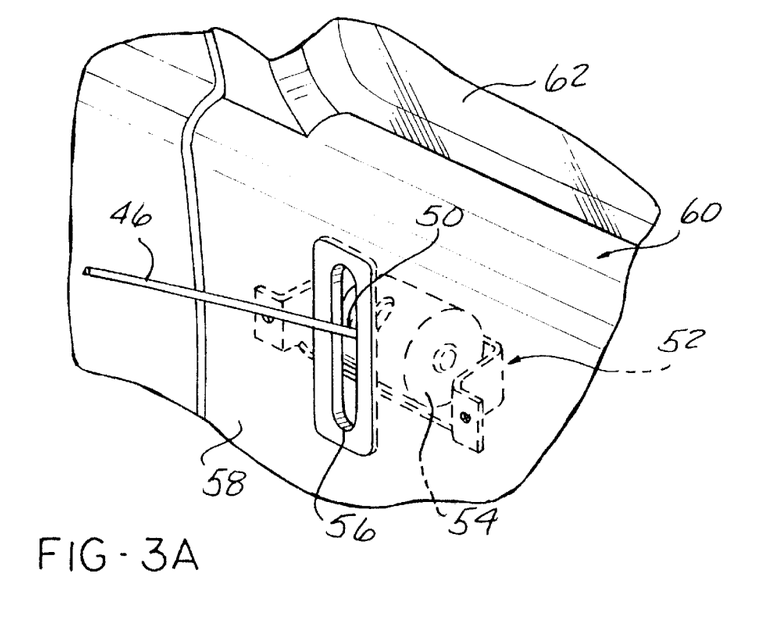
FIG. 3A is a cutaway perspective view of a lift gate, showing the retractable attachment cable extending from a manufacturer installed retractor with inertial (centrifugal brake) locking system shown in hidden line at the belt line.
Figure 3B:
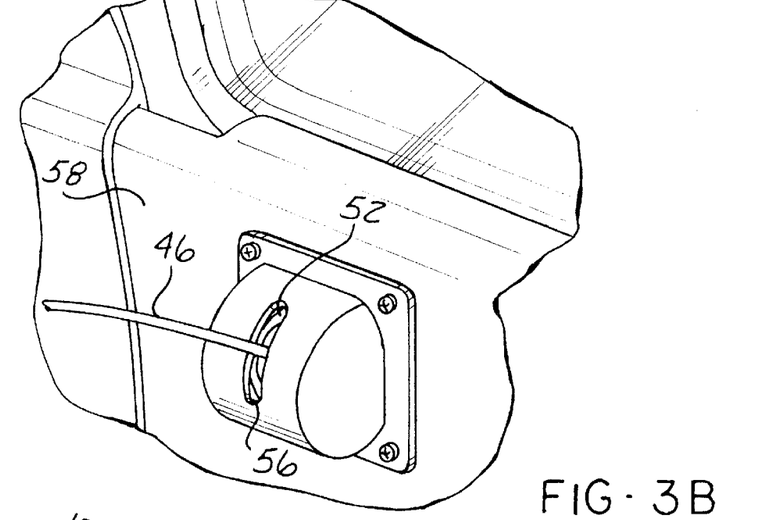
FIG. 3B is a cutaway perspective view of a lift gate, showing the retractable attachment cable extending from an after market retractor installed at the belt line.

Although it is to be understood that the retractable attaching means may comprise any suitable means, some preferred examples are shown in FIGS. 3A and 3B. Referring now to FIG. 3A, the retractable attaching means comprises a load-rated cord 46 having an end 50 and an attachment area 48, with attachment area 48 attached to the netting member 18. By "load-rated," it is meant that cord 46 has a controlled amount of strength and a known amount of stretch. The retractable attaching means further comprises a retractor member 52 attached to the cargo area 14, the retractor member 52 having an inertial, centrifugal brake locking apparatus 54, the cord end 50 being attached to the retractor member 52. Although in the preferred embodiment, an inertial pendulum (centrifugal brake) locking apparatus 54 is used (which functions similarly to a passenger seat belt retractor), it is to be understood that any suitable locking apparatus may be used in order to prevent further cord 46 from paying out in the event of a sudden stop or impact. Retractor member 52 may also further comprise (again, similar to a passenger seat belt retractor) a predetermined amount of spring loaded tension from a suitable tensioning apparatus. This spring loaded tension may aid in keeping stowage 28 from shifting within cargo area 14, and may enhance the aesthetics of net 10 by providing a neat appearance.

The embodiment shown in FIG. 3A is an option showing an OEM (Original Equipment Manufacturer) design, with the cord guide 56 shown heat-staked, molded or snap-fit to the lift gate trim panel 58; while that shown in FIG. 3B is an after market design.

Figure 2:
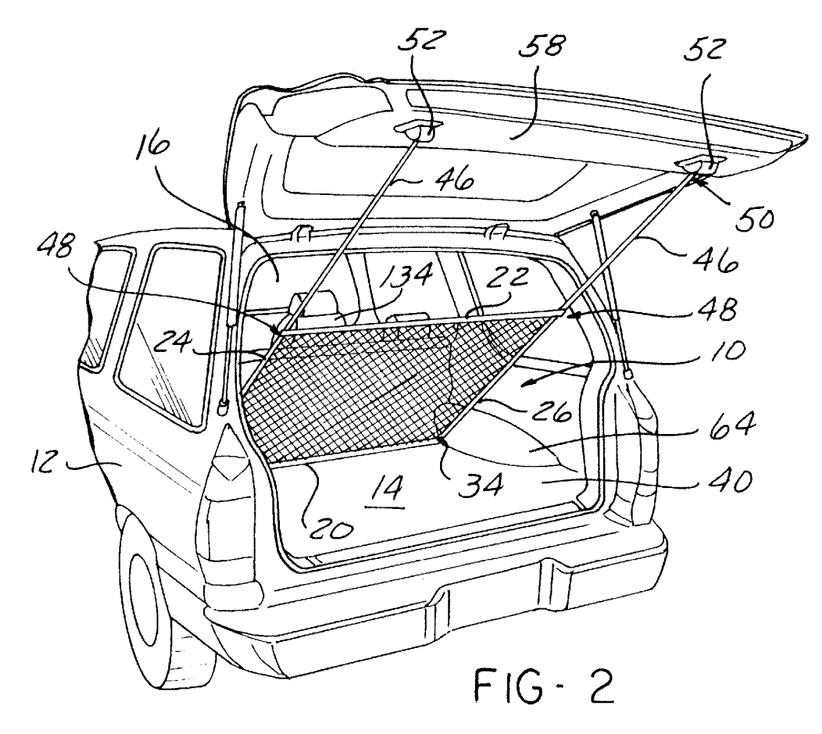
FIG. 2 is a cutaway perspective view of the load retention net of the present invention, shown installed in a station wagon with the lift gate open.

Although there may be any number of cords 46 located in any suitable area as desired, in the preferred embodiment, as best seen in FIG. 2, there are two load-rated cords 46, each cord 46 having an end (attachment area 48) adjacent either the netting member top 20 or bottom 22 (attachment area 48 is shown adjacent the bottom 22), each cord 46 attached to one of the opposed netting member sides 24, 24. Further, in the preferred embodiment, there are two opposed retractor members 52 at respective locations adapted to receive each of the two cord ends 50.

It is to be understood that the cords 46 may be formed of any suitable material which exhibits strength and low stretch, and by any suitable process. In the preferred embodiment, cord 46 comprises: web strap formed from at least one of nylon, polyester, polypropylene and the like; and/or braid on braid cord formed from at least one of nylon, polyester, polypropylene and the like; and/or twisted cable formed from at least one of galvanized or stainless steel and the like. Of these, most preferred are web strap and/or braid on braid cord, in that cord 46 formed from these materials is generally more shock absorbing than twisted cable and the like.

As shown in FIG. 2, the retractor members 52 are shown on the trim panel 58 at the lower edge portion of the lift gate. It is to be understood that retractor(s) 52 may also be installed at the "belt line" area 60, just below the window 62, as shown in FIGS. 3A and 3B. Further, the retractors 52 may be installed in or on the rear seat 44, in or on the wheel wells 64, or on the cargo area floor 40 behind rear seat 44. Similarly, for the embodiment as shown in FIG. 1, which depicts a passenger vehicle having fold-down rear seats 44, the retractors 52 may be located on the rearmost portion 68 of deck lid 66, or on the rear seat 44, in or on the wheel wells 64, or on the cargo area floor 40 behind rear seat 44.

Figure 2A:
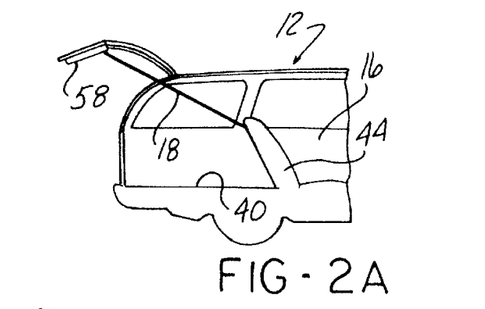
FIG. 2A is a partially schematic, cutaway view of the station wagon of FIG. 2, showing the net of the present invention attached to the upper rear area of the rear seat and to the belt line of the lift gate.
Figure 2B:
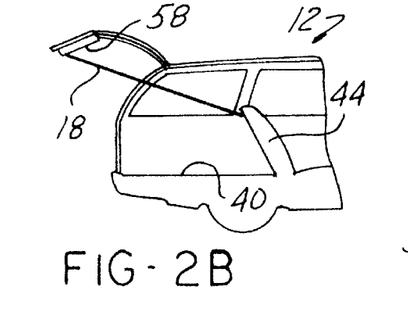
FIG. 2B is a view similar to that of FIG. 2A, showing the net of the present invention attached to the upper rear area of the rear seat and to the lower edge portion of the lift gate.
Figure 2C:
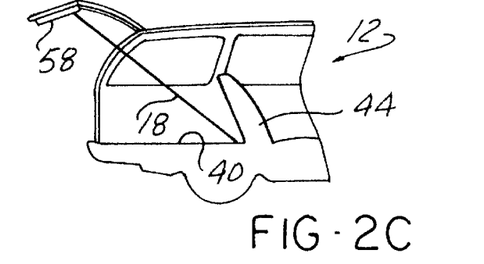
FIG. 2C is a view similar to that of FIG. 2A, showing the net of the present invention attached to the floor area adjacent the bottom of the rear seat and to the belt line of the lift gate.
Figure 2D:
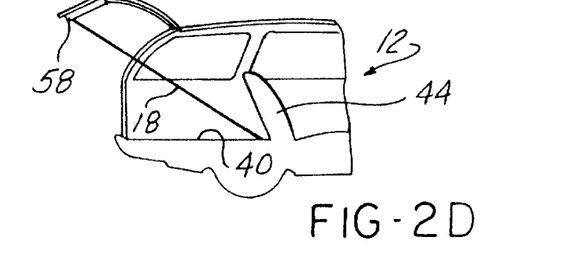
FIG. 2D is a view similar to that of FIG. 2A, showing the net of the present invention attached to the floor area adjacent the bottom of the rear seat and to the lower edge portion of the lift gate.

Referring now to FIGS. 2A–2D, the netting member 18 is shown attached at various locations within a station wagon motor vehicle 12. Net 10 is also useful within sport utility vehicles, mini vans and/or any transportation vehicle carrying loads which should be restrained from injuring passengers during impact and/or sudden stop situations. In FIG. 2A, the netting member 18 is shown attached to the upper area of rear seat 44 and the belt line 60 of the lift gate trim panel 58. In FIG. 2B, the netting member 18 is shown attached to the upper area of rear seat 44 and the lower edge portion of the lift gate trim panel 58. In FIG. 2C, the netting member 18 is shown attached to the cargo area floor 40 behind rear seat 44 and the belt line 60 of the lift gate trim panel 58. In FIG. 2D, the netting member 18 is shown attached to the cargo area floor 40 behind rear seat 44 and the lower edge bottom portion of the lift gate trim panel 58.

It is to be understood that the load retention net 10 of the present invention functions equally well with the rear seat 44 in the upright position (as shown) or in the folded down position. If the rear seat 44 is in the folded down position, the means for attaching top 20 of netting member 18 to the cargo area 14 which are closest to the (now more forward) passenger compartment 16 may be utilized. For example, if the top 20 attaching means utilized are defined in the upper area of rear seat 44, when rear seat 44 is folded down, this attaching means also moves forward, and becomes a top attaching means located substantially directly behind the front passenger seat 134. Further, there may be top 20 attaching means, including but not limited to any and/or any combination of and/or any variation of any of the couplers 30, 32; 84, 86 etc. located in or on the floor 40 of the (now larger, extending further forward) cargo area 14, substantially directly behind the front passenger seat 134.

Figure 5:
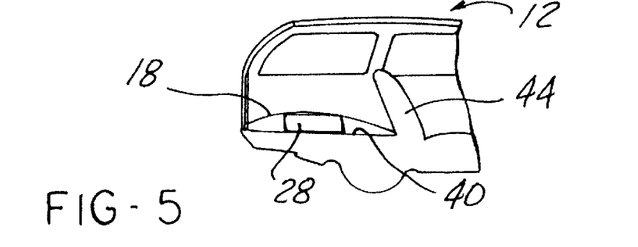
FIG. 5 is a partially cutaway schematic view of a station wagon, showing the net of the present invention installed at the floor behind the rear seat and at the lower edge portion of the lift gate, with the lift gate shown in the closed position.

Further versatility may be found in net 10 in that each of the four attachment areas discussed immediately above may be provided in a single motor vehicle. Thus, the consumer could decide which configuration best suited his or her needs. For example, attaching net 10 closer to floor level, as shown in FIG. 5, more closely holds stowage 28; whereas attaching net 10 at the belt line 60 and upper area of rear seat 44 accommodates a larger stowage capacity.

A further embodiment of the net 10' of the present invention is shown in FIGS. 6–8. In this embodiment, both of the netting member top 20 attaching means and the netting member bottom 22 attaching means are removable. As best seen in FIG. 6, the motor vehicle 12 is a station wagon having an open space 74 extending transversely between the cargo area 14 and the passenger compartment 16, with the netting member 18' extending across the open space 74.

The netting member 18' is generally rectangular and has four corners 76, 78, 80 and 82, and there is a netting member-to-cargo area attaching means disposed at each of the four corners 76, 78, 80 and 82, with the two upper corners 76, 78 being adjacent the interior roof (not shown) and above the window 62, and the two lower corners 80, 82 being located at the belt line 60.

Figure 7A:
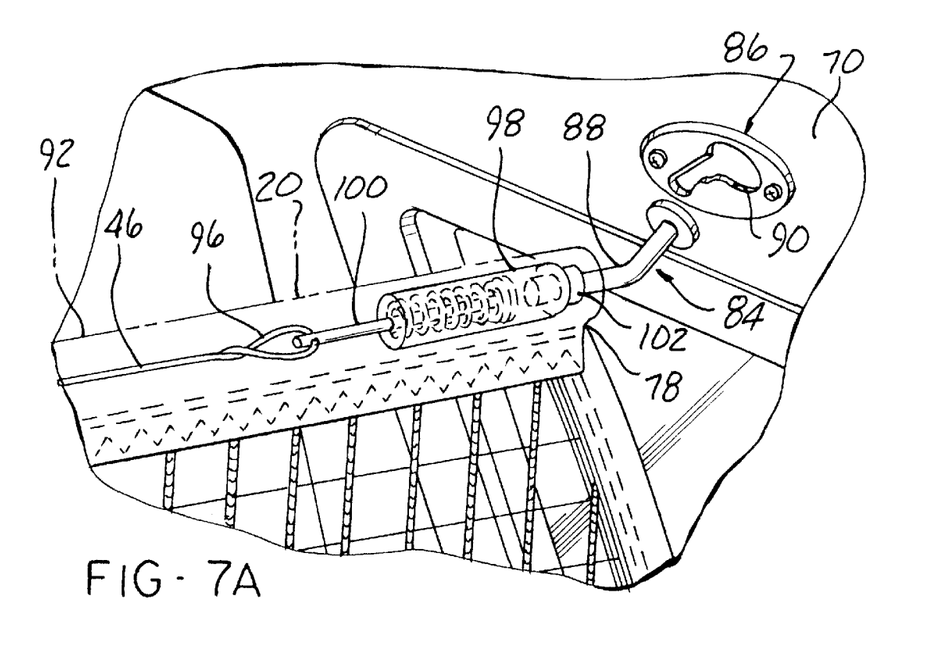
FIG. 7A is a partially cutaway, enlarged perspective view of the net of FIG. 6, showing an upper attachment means.
Figure 7B:
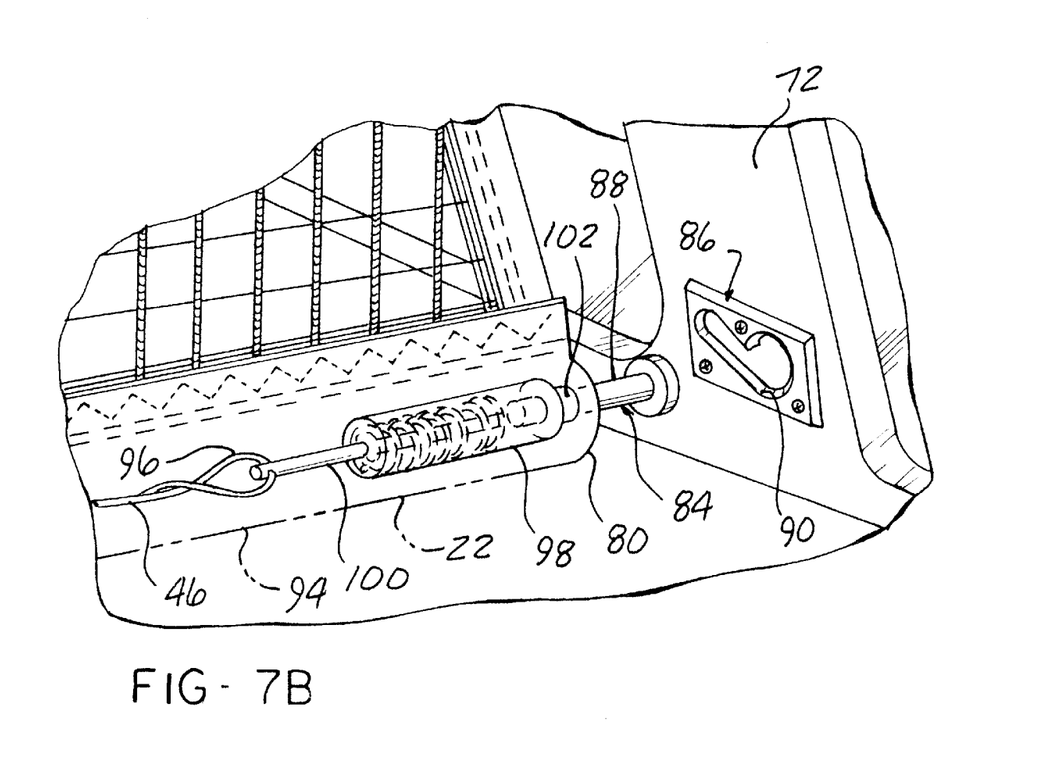
FIG. 7B is a partially cutaway, enlarged perspective view of the net of FIG. 6, showing a lower attachment means.

As best seen in FIGS. 7A and 7B, the attaching means comprises matingly engageable coupling members 84, 86, one coupling member 84 disposed at the netting member corner 78, 80, and the other coupling member 86 disposed at the respective motor vehicle location. As shown, the one coupling member 84 comprises a male projection 88, and the other coupling member 86 comprises a female portion defining a key slot 90. This attachment means is sturdy, yet is quick and easy for one person to attach/detach without need for special tools, for easy installation/storage.

Once removed, the net 10, 10' of any of the embodiments discussed herein may be easily rolled, folded or the like for easy and compact storage. The net 10 as shown in FIGS. 1–5 may be detachable from cord 46, which could suitably store in retractor members 52. Net 10 could then be rolled, folded, etc. and easily stored anywhere. However, in the preferred embodiment, net 10 is detachable from the removable attaching means, may be rolled up and stored in a suitably shaped open and/or closeable bag (not shown) attached to the lift gate and/or deck lid. The bag may be formed of any suitable material, including but not limited to nylon.

The net 10' as shown in FIG. 6 may further comprise means for rendering the netting member 18' taut across the open space 74. It is to be understood that this may comprise any suitable means. However, in the preferred embodiment, the taut rendering means is disposed at the top 20 and bottom 22 of the netting member 18', and comprises two sleeve members 92, 94, one 92 attached to the netting member top 20, and the other 94 attached to the netting member bottom 22. The sleeve members 92, 94 may be formed of any suitable material, however, in the preferred embodiment, this material is polyester or nylon web strap, or a woven vinyl material.

The taut rendering means may further comprise two load-rated cords 46, each cord 46 having opposed ends 96, each cord 46 longitudinally extending within a sleeve member 92, 94. Four spring loaded tension apparatuses 98 are provided, each tension apparatus 98 operatively attached at one end 100 to a cord end 96, and at the other end 102 to the male projection 88. In addition to contributing to load retention properties, the taut rendering means also may enhance the aesthetics of net 10'.

In addition to tautening the netting member 18', the spring loaded tension apparatus 98 may further function to absorb some of the shock experienced during a sudden stop or impact. Still further, apparatus 98 aids the consumer in attaching/detaching net 10' quickly and easily.

Figure 8B:
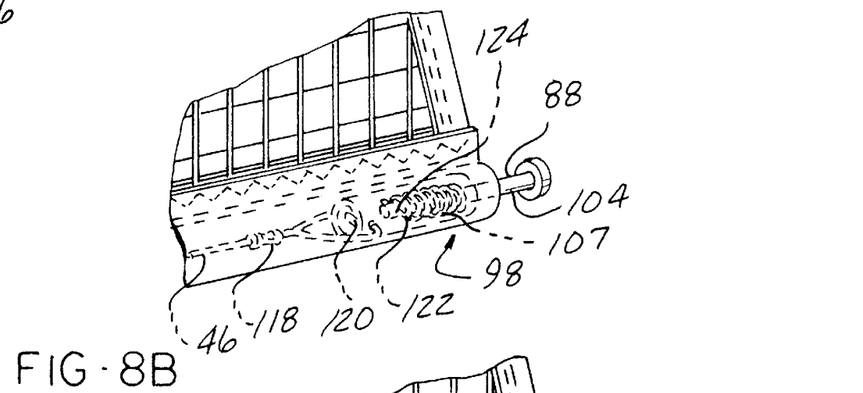
FIG. 8B is a partially cutaway, enlarged perspective view of an alternate attachment means and net tautening means.
Figure 8C:
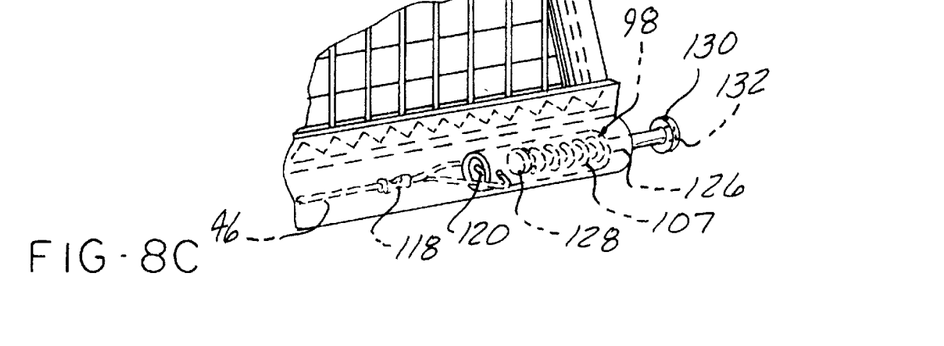
FIG. 8C is a view similar to that of FIG. 8B, showing a further alternate attachment means and net tautening means.

Alternate embodiments of the tautening means are shown in FIGS. 8A–8C. FIG. 8A is an exploded view of the mechanism shown in FIG. 7B. Cord end 96 is attached to spring retainer rod 104 via throughbore 106. Spring 107 is retained by rod 104 within cylinder 108. Cylinder cap 110 is bonded to cylinder 108, and attachment rod/male projection 88 is attached to cap 110 via screw 112 and threaded bores 114, 116. In FIG. 8B, cord 46 has a crimped-on cable clip 118, and end 96 is attached to cylinder 108 via cable sleeve 120. In lieu of clip 118, cord 46 could terminate in a sewn loop 96. Spring 107 is retained by retainer pin 122 via throughbore 124 located in male projection 88. In FIG. 8C, a retainer rod 126 retains spring 107 within cylinder 108 via annular flange 128. Retainer rod 126 has a smooth shaft with a threaded end 132 located distally from the annular flange 128. The threaded end 132 is threadingly engaged within end cap 130. Any of the above tautening means components may be formed of any suitable materials and by any suitable process. Components such as cylinder 108, cap 110, rods 104, 126, etc. may be formed of engineered plastic and/or metal; however, in the preferred embodiment, these components are formed from engineered plastic.

With any of the embodiments or alternates discussed hereinabove, it is to be understood that any of the attaching means, removable or retractable, as well as any suitable alternate means able to restrain predetermined, specified loads, may be used interchangeably at any of the attachment areas (upper and/or lower area of rear seat 44, upper and/or lower area of front seat 134, cargo area floor 40, behind the rear 44 and/or front 134 seats, deck lid 66, lift gate trim panel 58, interior trim panels 70, 72, etc.) and/or in any suitable attachment location. For each of the attaching means (including couplers 30, 32; 84, 86), any suitable alternate may be used in light of the following: it is preferred that the attaching means be individually engineered (size, shape, configuration, material (it is to be understood that this is what is meant by the term "engineered plastic" as used herein), process for making, location and attachment means within the vehicle, etc.), dependent upon, for example, their respective locations within the motor vehicle, to meet specified load forces generated in a specific vehicle during a specified impact situation.

For example, one characteristic to be considered during such engineering is the momentum of stowage 28 which would be generated during an impact situation—this momentum would vary, depending upon the initial, pre-impact location of the stowage 28. As such, this is a characteristic which is considered when determining desired load bearing capabilities of attaching means, eg. couplers 30, 32; 84, 86.

The net 10 of the present invention as described hereinabove achieves the objects and advantages set out heretofore.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A motor vehicle having a passenger compartment, a cargo floor with a front area, a hinged exterior door which opens from outside the vehicle to provide access to the cargo floor, and a net type cargo restraining system, the restraining system comprising:

a net member having a length, the net member being detachably connected between a first point proximate the front area of the cargo floor and a second point on the door, whereby the net member is raised and lowered with the door to provide access to the cargo floor for loading and unloading purposes and to capture cargo on the floor when the door is closed;

means for varying the length of the net member between the first point and the second point, thereby to accommodate cargo of varying size; and means for maintaining significant tension in the net member, thereby to closely conform the net member to the cargo and to positively restrain the cargo from entering the passenger compartment.

2. The motor vehicle as defined in claim 1 wherein the net member is pliable but essentially inelastic.

3. The motor vehicle as defined in claim 2 wherein the net member comprises a lightweight, resilient and strong synthetic material selected from the group consisting of coated polyesters, multifilament polypropylenes, nylons, and mixtures thereof.

4. The motor vehicle as defined in claim 3 wherein the net member is formed by at least one of woven, knitted, rochelle, and weft insertion processes.

5. The motor vehicle as defined in claim 1 wherein the varying means and the tension maintaining means comprise tension roller means.

6. The motor vehicle as defined in claim 5 wherein the tension roller means comprises:

a load-rated cord having two opposed ends, one cord end being attached to the net member; and a retractor member attached to at least one of the hinged exterior door and the cargo floor, the retractor member having an inertial, centrifugal brake locking apparatus, the other cord end being attached to the retractor member.

7. The motor vehicle as defined in claim 5 wherein the motor vehicle has one of a deck lid and a lift gate, and wherein the tension roller means is disposed on the one of the deck lid and the lift gate.

8. The motor vehicle as defined in claim 1 wherein the cargo weighs between about 20 Kg and about 100 Kg, and wherein the cargo is restrained during an impact up to about 50 km/h, and further wherein the net member deflects not more than about 300 mm during the impact.

9. The motor vehicle as defined in claim 1 wherein the net member is removable from one of the first connector point and the second connector point, and the net member is retractable from the other of the first connector point and the second connector point.

10. A method for restraining cargo in a motor vehicle having a passenger compartment, a cargo floor with a front area, and a hinged exterior door which opens from outside the vehicle to provide access to the cargo floor, the method comprising the steps of:

placing cargo on the cargo floor; and restraining the cargo from entering the passenger compartment by a net type cargo restraining system, the restraining system comprising:

a net member having a length, the net member being detachably connected between a first point proximate the front area of the cargo floor and a second point on the door, whereby the net member is raised and lowered with the door to provide access to the cargo floor for loading and unloading purposes and to capture cargo on the floor when the door is closed; and means for varying the length of the net member between the first point and the second point thereby to accommodate cargo of varying size: and means for maintaining significant tension in the net member, thereby to closely conform the net member to the cargo and to positively restrain the cargo from entering the passenger compartment.

11. The method as defined in claim 10 wherein the varying means and the tension maintaining means comprise tension roller means.

12. The method as defined in claim 11 wherein the tension roller means comprises:

a load-rated cord having two opposed ends, one cord end being attached to the net member; and a retractor member attached to at least one of the hinged exterior door and the cargo floor, the retractor member having an inertial, centrifugal brake locking apparatus, the other cord end being attached to the retractor member.

13. The method as defined in claim 11 wherein the motor vehicle has one of a deck lid and a lift gate, and wherein the tension roller means is disposed on the one of the deck lid and the lift gate.

14. The method as defined in claim 10 wherein the net member is pliable but essentially inelastic.

15. The method as defined in claim 10 wherein the cargo weighs between about 20 Kg and about 100 Kg, and wherein the cargo is restrained during an impact up to about 50 km/h, and further wherein the net member deflects not more than about 300 mm during the impact.

16. The method as defined in claim 10 wherein the net member is removable from one of the first connector point and the second connector point, and the net member is retractable from the other of the first connector point and the second connector point.

* * * * *

UNITED STATES PATENT AND TRADEMARK OFFICE
CERTIFICATE OF CORRECTION

PATENT NO. : 5,772,370
DATED : June 30, 1998
INVENTOR(S) : Donal Moore

It is certified that error appears in the above-identified patent and that said Letters Patent is hereby corrected as shown below:

Col. 10, line 29; insert --,-- after "point"
Col. 10, line 30; delete ":"
Col. 10, line 30; insert --;-- after "size"

Signed and Sealed this

Fifteenth Day of August, 2000

Attest:

Q. TODD DICKINSON

Attesting Officer

Director of Patents and Trademarks